Figure 6:
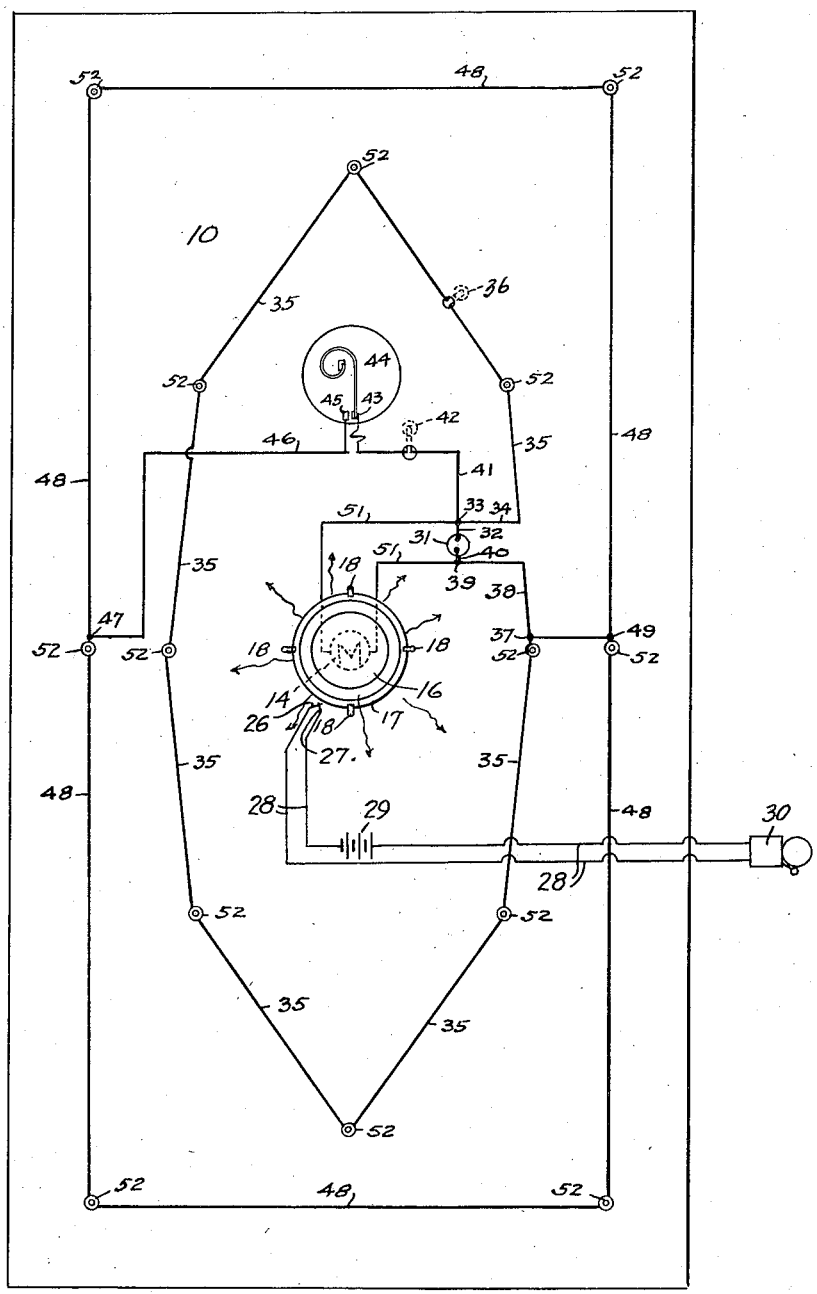

Aug. 20, 1935.  H. F. RAU  2,012,088
BROODER
Filed May 26, 1934  2 Sheets-Sheet 1
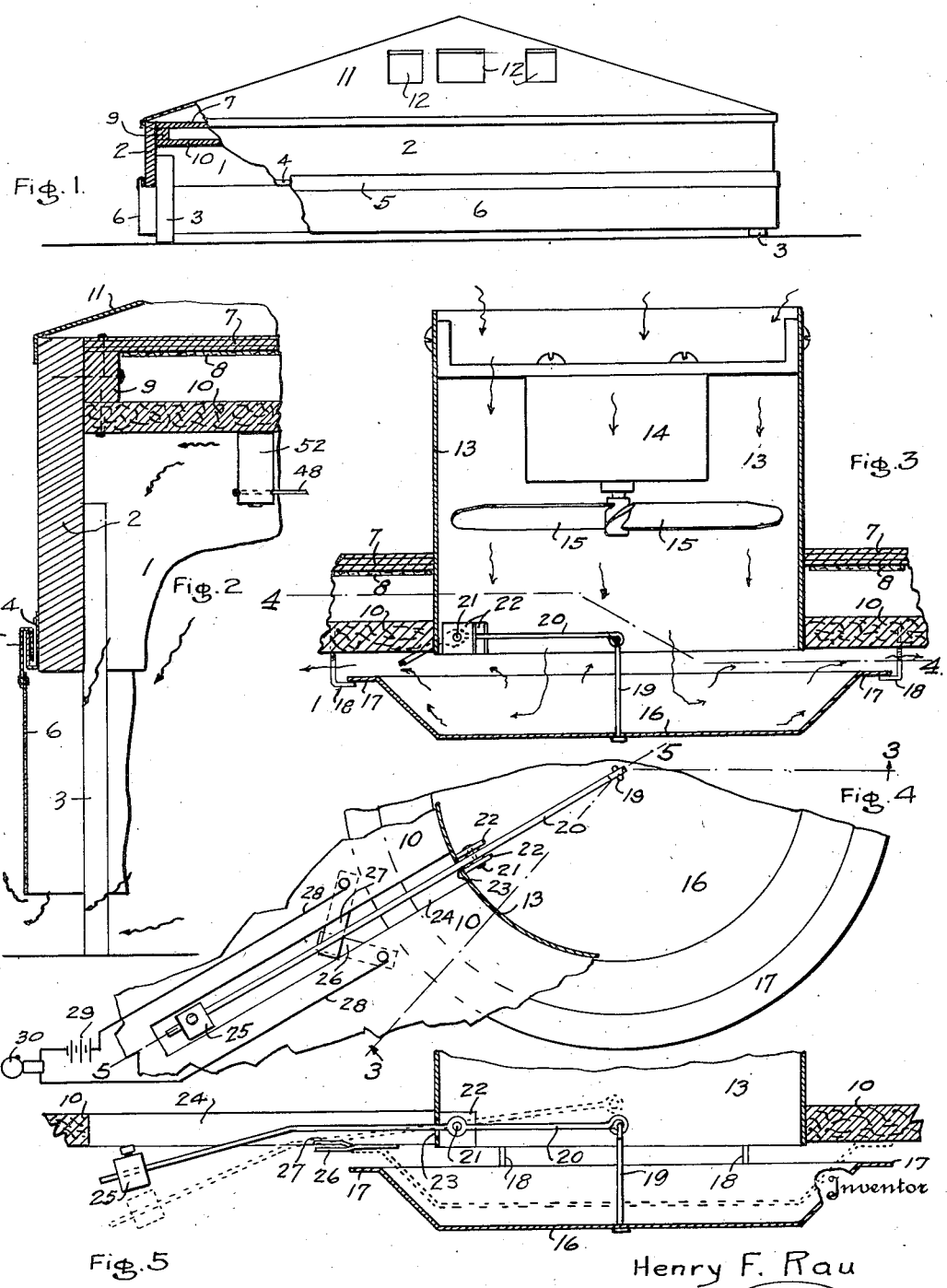
Inventor
Henry F. Rau Aug. 20, 1935.  H. F. RAU  2,012,088

BROODER

Filed May 26, 1934   2 Sheets-Sheet 2

Inventor

Henry F. Rau

By

Attorney

Patented Aug. 20, 1935

2,012,088

UNITED STATES PATENT OFFICE 2,012,088

BROODER

Henry F. Rau, Tacoma, Wash.

Application May 26, 1934, Serial No. 727,752

4 Claims. (Cl. 119—33)

My invention relates to devices for protecting chicks and other young fowl during their first growth, commonly known as brooders, and has special reference to such devices as are adapted to use electricity and are intended to care for large broods, say 1000 chicks.

My invention has for its objects to provide means, first, whereby the chicks are constantly provided with plenty of clean, fresh, warm air; second, whereby said air is drawn into the brooder at the top thereof; third, whereby the supply of fresh air is evenly distributed over the top of the brooder and flows evenly to all parts of the floor thereof; fourth, whereby the supply of fresh air is immediately shut off and the warmth retained in the brooder if the flow of electric energy should be interrupted; fifth, whereby, in case of such interruption of electric service, an alarm bell is automatically sounded; sixth, whereby the top of the brooder chamber is well heat-insulated, thereby preventing the escape or waste of heat through the top; seventh, to permit the ready removal of the brooder curtains for the purpose of cleaning or other purposes; and eighth, to provide a brooder of great efficiency in heating and of pronounced success in rearing young chicks, which is automatic and simple in operation.

I attain these and other objects by the devices, mechanisms, and arrangements illustrated in the accompanying drawings, in which—

Fig. 1 is an end elevation of my improved brooder, a part thereof being broken away; Fig. 2 is a view on an enlarged scale of a portion of the structure shown in Fig. 1; Fig. 3 is a vertical section of the ventilating apparatus taken on the line 3—3 in Fig. 4; Fig. 4 is a plan of a part of the draft deflecting apparatus taken on the line 4—4 in Fig. 3; Fig. 5 is a vertical section thereof, taken on the line 5—5 in Fig. 4 showing in dotted lines the positions assumed thereby when the ventilating motor is not in operation; and Fig. 6 is a bottom plan view of the ceiling of the brooder, showing the arrangement of the heating wires and control apparatus.

Similar numerals of reference refer to similar parts throughout the several views.

Referring now, to the drawings, the brooder comprises a brooder chamber 1 formed of four walls 2, mounted on legs 3, and adapted to be placed on the floor of the chicken building, said walls extending downward from the ceiling about one-half way to the ground. Each wall 2 is provided, on its outer lower edge, with a metal U-shaped channel 4 (Fig. 2). An inverted U-shaped channel 5 fits in and hangs freely from the said channel 4, and is provided with the brooder curtain 6, securely attached thereto. This curtain 6 is made of fabric and hangs from the walls 2 downward to a point about one inch above the ground. Each curtain 6 is therefore readily removable from the brooder by simply lifting the channel 5 out of the channel 4. The ceiling of the brooder is comprised of an upper sheet 7 of three-ply veneer wood (Figs. 2 and 3) having a sheet of felt 8 glued, or otherwise fastened, to its lower surface, said sheet 7 being secured to a suitable frame 9 which separates it from the lower sheet 10 of the ceiling. This sheet 10 is formed of a suitable heat-insulating material, such as a compound fiber board or other similar fibrous material, secured to the lower side of the frame 9. The space between the parts 7 and 10 forms a substantially closed air chamber which further acts as a heat insulator. The upper part of the brooder comprises a removable sheet-metal roof 11, fitting on the upper edge of the wall 2 (Fig. 2). The roof 11 is provided with suitable air inlet holes 12 (Fig. 1)

At the center of the ceiling I mount my ventilating apparatus. A vertical tube 13 penetrates the ceiling of the brooder chamber 1 (Fig. 3) and is provided with a small electric motor 14, suitably suspended therein, said motor 14 being provided with suitable fan blades 15 at the lower end of its shaft. The direction of rotation is such as to cause the fan to drive the air downward in the tube 13. The lower mouth of the tube 13 is substantially flush with the lower surface of the fiber sheet 10.

A deflector plate 16 is hung centrally under the opening of the tube 13. This plate 16 is dished and is substantially larger in diameter than the tube 13. The maximum distance of the rim 17 of the dish 16, from the sheet 10, is governed by a plurality of screw hooks 18 extending downward from said fiber board 10 and passing under the rim 17. Said hooks 18 may be adjusted by screwing them further in or out of the board 10.

The plate 16 is hung by a link 19, engaging its center, from the end of a lever 20. This lever 20 is pivoted at 21 to a pair of brackets 22, extending inward from the tube 13, and passes through a hole 23 in the tube 13, and lies in a slot 24 in the sheet 10 and is then bent downward and provided with a counterbalance weight 25, adjustably secured thereon. The weight 25 is of such size and is positioned so that it overbalances the weight of the plate 16 at the other end of the lever 20.

A pair of contact strips 26 and 27 are mounted on the lower side of the sheet 10, on each side of the slot 24, and are positioned so that they cross each other at slightly different levels at a point directly under the lever 20 (Figs. 4 and 5) and are adapted to be pressed together to make electric contact with each other when the weight 25 raises the plate 16. Electric wires 28 connect the two said strips 26 and 27 to a battery 29 and an electric alarm bell 30, which is therefore sounded when the plate 16 is raised.

The brooder is heated by means of suitable high-resistance wires in which a suitable current is flowing. Referring to Fig. 6, it will be seen that the plug 31 is adapted to be connected to a suitable source of electric energy, not shown. One wire 32 leads from this plug 31 to a junction 33, and a connecting wire 34 leads therefrom to the smaller heating circuit 35 (say 100 watt) in which a pilot light 36 may be connected, and thus to the junction 37 and the wire 38 to the junction 39 and the other wire 40 of the plug 31. This smaller heating circuit is arranged to be constantly energized. The larger heating circuit (say 800 watts) leads from the junction 33, by the wire 41 through the pilot light 42 to the terminal 43 of the thermostat 44. The other terminal 45 of the thermostat is connected to the wire 46 which leads to the junction 47 with the heating wire 48. The current splits at the junction 47 and passes through both circuits 48 in parallel to the junction 49 and thence by the wire 50 to the junction 37, and so back to the plug 31.

The electric motor circuit 51 leads from the junction 33 through the motor 14 to the junction 39. The motor 14 is, therefore, in constant operation. All the wires are suitably supported on insulators 52.

Thus it will be seen that the circuit 35 is providing heat for the brooder all the time, while the circuit 48 only provides heat when the temperature drops below the required standard; that the fan is in constant operation sucking fresh air through the openings 12 in the roof 11 and forcing it down against the plate 16. This flow of air forces the plate 16 down, raising the weight 25 and breaking the contact of the strips 26 and 27 of the alarm circuit. The air escapes over the rim 17 of the plate and flows horizontally to the small heating circuit 35 and then the larger heating circuit 48. The air is warmed thereby and passes down to the floor and out under the curtains 6, as indicated by the flow arrows in Figs. 2 and 3.

The heat is practically all sent downward to the chicks but the air space between the sheets 8 and 10 becomes gradually warmed. If, now, the electric current is inadvertently shut off, the chicks will not suffer because, first, the motor 14 stops, allowing the weight 25 to raise the plate 16 up against the surface of the sheet 10, thus effectively closing the tube 13 and preventing the escape of heat thereby and, second, the heat retained by the ceiling construction is sufficient to give enough warmth for the chicks for a considerable period. Meantime, as the plate 16 is raised, the alarm bell 30 is sounded warning the operator to take steps to correct the fault or arrange for emergency heat.

The electric heating wires are adapted to heat the brooder principally by heating the flow of fresh air forced thereinto by the fan, though a smaller degree of heat is radiated direct from said wires to the ground, walls, ceiling and chicks.

The above-described curtain-hanging channels 4 and 5 are continuous on each side of the brooder and, therefore, prevent the escape of air from the brooder chamber above the curtain 6.

It is, of course, understood that many changes may be made in the details of construction of my improved brooder without departing from the spirit of my invention as outlined in the appended claims.

Having described my invention, what I claim and desire to secure by Letters Patent is:—

1. A brooder comprising a brooding chamber having walls and a ceiling; an opening in the ceiling thereof; a downward-acting fan in said opening; a draft deflector mounted below said opening and adapted to throw the draft laterally on the underside of the ceiling and counterbalancing means engaging said draft deflector, said counterbalancing means being adapted to raise said draft deflector against the ceiling to close said opening in the ceiling when said fan is inoperative.

2. A brooder comprising a brooding chamber having walls and a ceiling; an opening in the ceiling thereof; a downward-acting fan in said opening; a draft deflector mounted below said opening and adapted to throw the draft laterally on the underside of the ceiling; counterbalancing means engaging said draft deflector and adapted to raise said draft deflector to close the opening in the ceiling when the fan is inoperative; and an electric alarm circuit operated by said counterbalancing means and adapted to sound an alarm when said draft deflector is thus raised.

3. A brooder having walls raised from the floor of the brooder chamber; a ceiling composed of two separated sheets with confined air-space therebetween; an electric heating system adapted to be connected to a source of electricity and composed of electric wires supported by and under said ceiling, and widely distributed thereunder; a vertical central tube piercing said double ceiling and extending upward therefrom; downward-acting draft-forcing means within said tube; and a check-valve below said tube and adapted to close the orifice of said tube against the upward escape of warm air from the brooder chamber when said draft-forcing means is inoperative, whereby the cooling of said brooder chamber is materially delayed.

4. A brooder as set forth in claim 3, wherein said electric heating system and said draft-forcing means are adapted to be connected to the same source of electricity; together with an independently energized alarm-sounding means controlled by said check-valve, and adapted to sound an alarm when the orifice of said tube has been closed thereby.

HENRY F. RAU.